(12) United States Patent
Ponti

(10) Patent No.: US 7,896,227 B2
(45) Date of Patent: Mar. 1, 2011

(54) APPARATUS FOR RECOGNIZING USER IDENTIFYING DATA, STORED ON A SUPPORT, AND FOR JOINING THIS SUPPORT TO A CORRESPONDING DOCUMENT TO BE SENT TO THE USER

(75) Inventor: Francesco Ponti, Cerbara-Citta'di Castello (IT)

(73) Assignee: C.M.C. S.r.l., Cerbara-Citta di Castello (Perugia) (IT)

( * ) Notice: Subject to any disclaimer, the term of this patent is extended or adjusted under 35 U.S.C. 154(b) by 896 days.

(21) Appl. No.: 11/813,557

(22) PCT Filed: Jan. 12, 2006

(86) PCT No.: PCT/IB2006/000037

§ 371 (c)(1),
(2), (4) Date: Jul. 9, 2007

(87) PCT Pub. No.: WO2006/092674

PCT Pub. Date: Sep. 8, 2006

(65) Prior Publication Data

US 2008/0164319 A1 Jul. 10, 2008

(30) Foreign Application Priority Data

Jan. 14, 2005 (IT) .......................... BO2005A0014

(51) Int. Cl.
*G06F 17/00* (2006.01)
(52) U.S. Cl. ...................................... 235/375; 235/475
(58) Field of Classification Search .......... 235/475–480
See application file for complete search history.

(56) References Cited

U.S. PATENT DOCUMENTS 3,822,523 A * 7/1974 Russell et al. ................. 53/492
5,161,930 A * 11/1992 Canziani ................ 198/370.06
6,554,123 B2 * 4/2003 Bonnet ................... 198/370.04

FOREIGN PATENT DOCUMENTS

| DE | 10250653 A1 | 5/2004 |
|---|---|---|
| DE | 10304450 A1 | 8/2004 |
| EP | 0341524 A1 | 11/1989 |
| EP | 0984389 A | 3/2000 |

OTHER PUBLICATIONS

International Search Report, 2006.

* cited by examiner

*Primary Examiner*—Thien M. Le
*Assistant Examiner*—Christopher Stanford
(74) *Attorney, Agent, or Firm*—William J. Sapone; Coleman Sudol Sapone P.C.

(57) ABSTRACT

An apparatus (100) recognizes user identifying data, stored in a support, for joining the support to a document containing personal information. A plurality of reading devices (12) read and recognize the data stored in each support (11). A work unit (L) has a work surface (1) on which the reading devices (12) are placed, the work surface (13) rotated to convey angularly the reading devices (12), so that each of them is placed subsequently in a position corresponding to a first section (S1) and to a second section (S2) of the work unit (L). First conveying means (T1) convey the supports (11) to a respective reading device (12). Second conveying means (T2) then convey the supports (11) from the reading device (12) to a section (20) of a feeding line (A), so as to join the support (11) to corresponding documents (D), fed to the section (20).

25 Claims, 3 Drawing Sheets

APPARATUS FOR RECOGNIZING USER IDENTIFYING DATA, STORED ON A SUPPORT, AND FOR JOINING THIS SUPPORT TO A CORRESPONDING DOCUMENT TO BE SENT TO THE USER

FIELD OF THE INVENTION

The present invention relates to the technical field concerning automatic and semi-automatic enveloper machines for associating one or more sheets containing personal data to be sent to a specific recipient with a relative insert or support containing corresponding data or identifying codes of the same recipient.

More precisely, the present invention relates to an apparatus, which recognizes user identifying data, stored on a support, and then joins the support to a corresponding document, which must be sent to the user.

The apparatus is particularly indicated to be used in automatic envelopes machines.

DESCRIPTION OF THE PRIOR ART

In the above described technical field, there is the need for service firms, credit institutions, etc. to handle automatically the distribution of communications and/or personal documents to their clients, together with a relative support, such as e.g. a card, containing data and/or information identifying the clients.

For example, the credit institutions usually send to their clients cash point cards and credit cards, which have magnetic stripes storing personal codes, together with a document, containing personal pieces of information.

In the pay-TV services, e.g. supplied by satellite equipment, the suppliers send to their clients the service access cards (smart-cards), which have a small microprocessor (chip), storing personal access data, and which are to be introduced into decoders.

The smart cards are sent together with a document, containing the user's personal data.

Usually, the document, which is to be added to a related magnetic card, or to a chip card, contains a bar code for recognizing and identifying the recipient.

Therefore, in order to associate safely the document to the relative support, both corresponding to the same recipient, it is necessary to read, before performing such association, the data stored in the magnetic stripe or in the chip, as well as the bar code put on the document, so as to verify the actual correspondence.

At present, the bar code reading is extremely rapid and quick, (less than one second), while the reading of information stored in the magnetic stripes or chips usually require 1.5, -2 seconds.

It is obvious that the time necessary for reading the magnetic stripes and chips, affects directly and negatively the processing rate, which can be assured by enveloper machines.

The actual enveloper machines can normally assure processing rate of about 7000/8000 introductions Of articles into relative envelopes per hour.

When the enveloper machines must perform the above mentioned reading operations, in order to assure a safe joining of the support to the corresponding document, the processing rate drops drastically about 1300/2400 introduction operations per hour..

SUMMARY OF THE INVENTION

Therefore, the main object of the present invention is to propose an apparatus for recognizing user identifying data stored on a support and for joining the support to a corresponding document to send to the user, specially for enveloper machines.

In particular, the object of the present invention is to propose an apparatus, which performs operations necessary for the recognition of data stored on a support and for joining it to a corresponding document in such a way, as to maintain high processiag rate of the enveloper machine, as required.

Another object of the present invention is to propose an apparatus, which assures a safe and secure joining of a support and a related document to send to a corresponding recipient.

The above mentioned objects are wholly obtained in accordance with the contents of the claims.

BRIEF DESCRIPTION OF THE FIGURES

The characteristic features of the invention are shown in the following description, given as a not limiting example, with reference to the enclosed Figures, in which.

DESCRIPTION OF PREFERRED EMBODIMENTS

Figure 1:
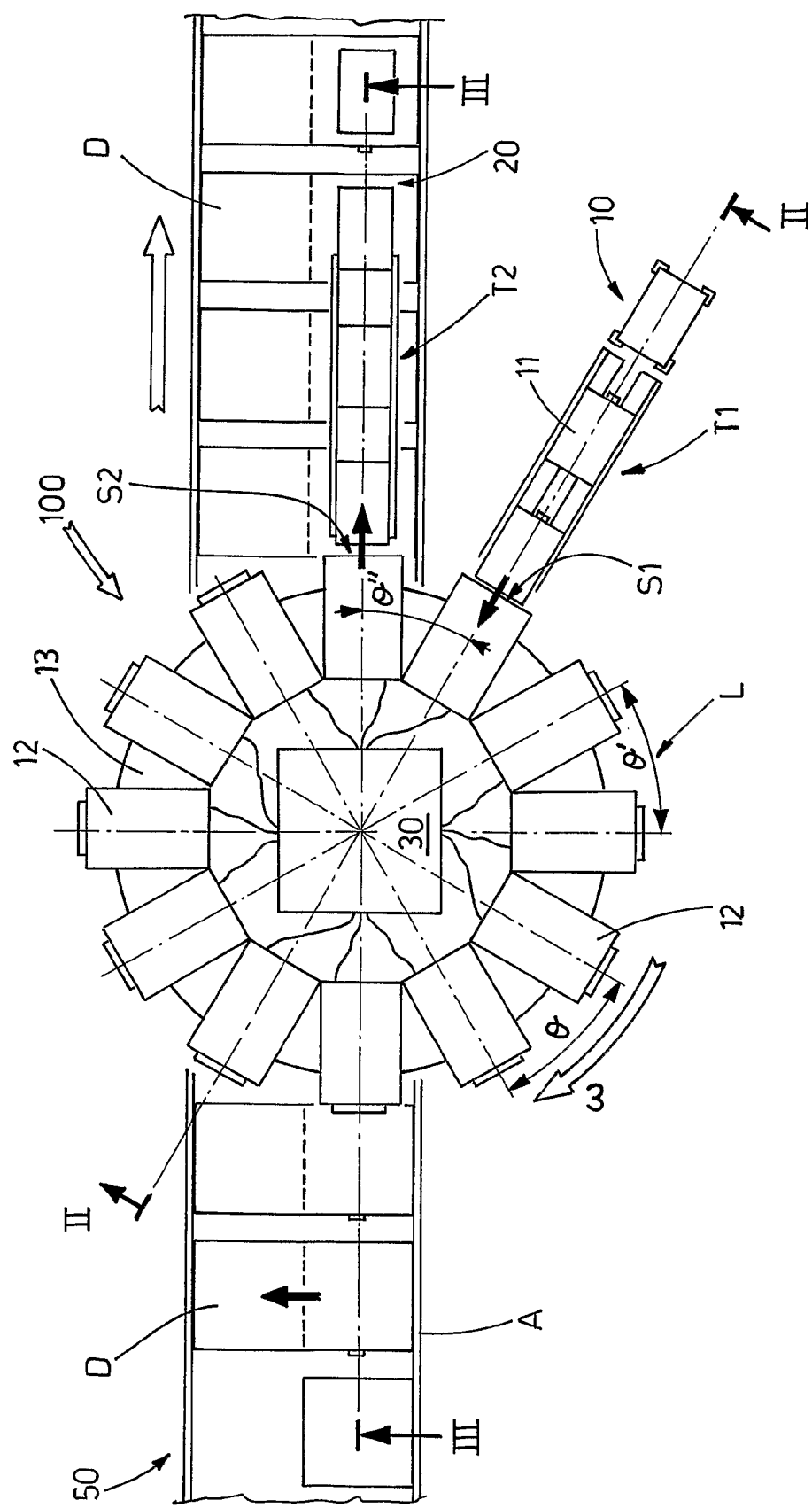
FIG. 1 is a schematic, top view of the apparatus, proposed by the present invention, aimed at recognizing user identifying data stored on a support, and at making a line of the support to a corresponding document to send to the user, the apparatus being connected to a line feeding documents of a enveloper machine.

With regards to the enclosed Figures, the reference numeral 100 indicates the apparatus, as a whole, proposed by the present invention, for user identifying data stored on a support, and for joining the support to a corresponding document to send to the user.

The apparatus 100 proposed by the Present invention is used in the enveloper machines, which usually have, as shown in FIG. 1, a feeding line A for a series of documents D, containing personal pieces of information concerning corresponding recipients.

Figure 2:
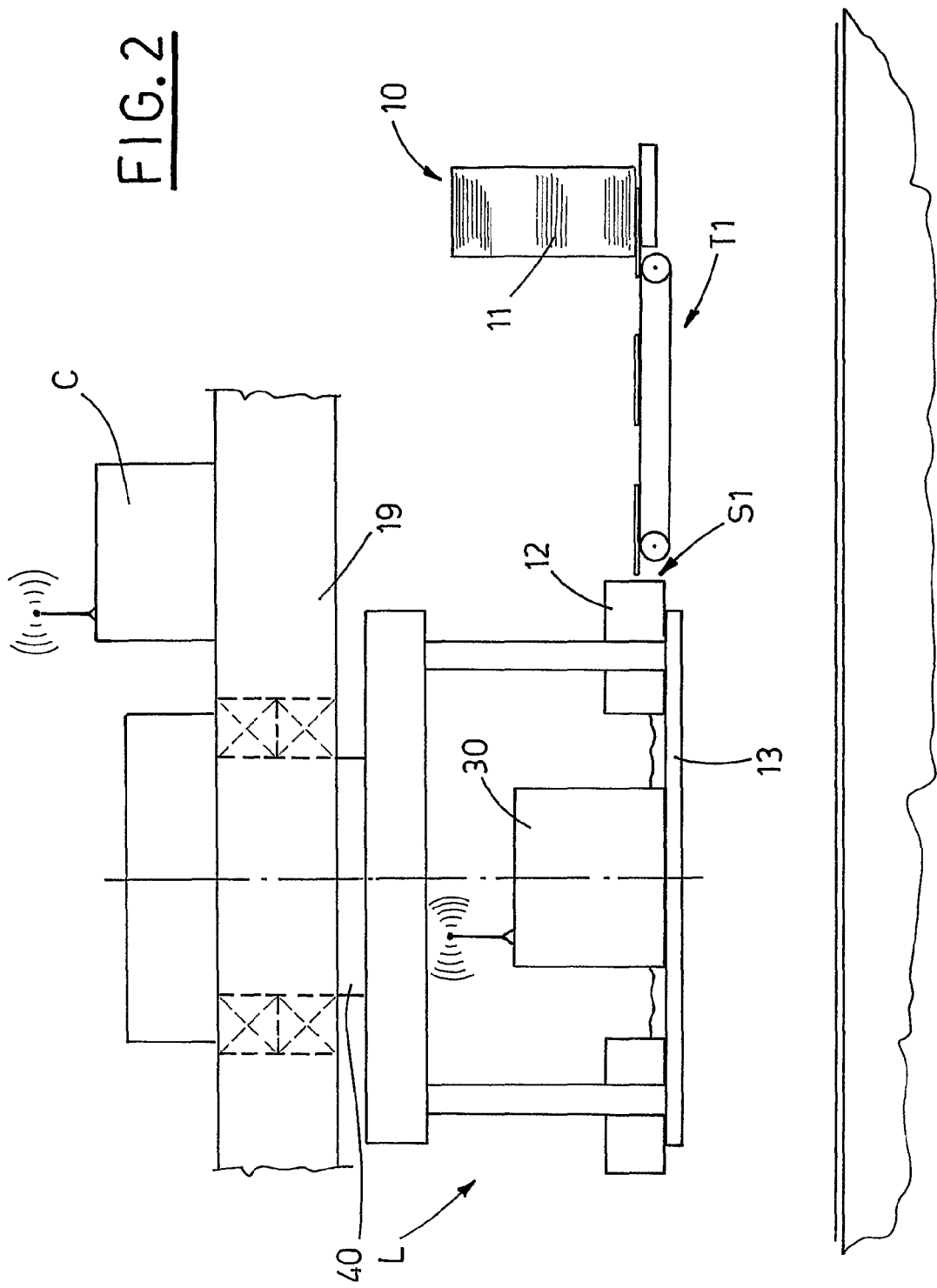
FIG. 2 is a section view taken along II-II of FIG. 1.

The feeding line A is subjected to a control unit C (shown in FIG. 2), aimed at managing and operating various work units of the enveloper machine (not shown), and at transferring the documents D, arranged one after another, to the enveloping unit (not shown).

Before being introduced into the envelopes, the documents D must be associated with respective supports 11, containing identifying information, corresponding to the information present on the documents and concerning the recipients.

The supports 11 can be magnetic cards, like e.g. cash point cards and credit cards, in which identifying data are stored, or cards like smart cards, having a memory chip, which contains the information and identifying codes of a relevant user.

The apparatus 100, proposed by the present invention, is characterized by the fact that the reading and identification of the data stored in the supports 11 (reading of the data stored in the magnetic stripe or in the chip) do not influence the working way of the line A feeding documents D: this allows to maintain substantially unchanged the processing rate of the corresponding enveloper machine.

As a matter of fact, due to the apparatus 100, proposed by the present invention, the speed of feeding documents D along the line A, and consequently the feeding speed of the machine enveloping unit, is not affected by the time necessary to recognize the data stored in the supports 11.

Therefore, the documents D can be fed along the feeding line A at the proper speed (or frequency) of the enveloper machines and consequently allow to perform 7000/8000 introductions per hour.

For this purpose, as shown schematically in FIG. 1, the apparatus 100 includes:
- a magazine 10 for supports 11, placed one over another;
- a plurality of reading devices 12, capable of reading and recognizing the identifying data stored in the supports 11;
- a work unit L, situated near the feeding line A and having a work surface 13, which houses the reading devices 12, situated in such a way, as to have the face for introduction of the support 11 near the circular peripheral edge of the surface 13 and interfaced with an electronic processor, likewise situated on the surface 13;
- first conveying means T1, situated between the magazine 10 and a first section S1 of the unit L;
- second conveying means T2, situated between a second section S2 of the unit L and a section 20 of the line A feeding the documents D.

The work unit L includes actuator means 40, controlled by the above mentioned control unit C (see FIG. 2), to drive the work surface 13 into rotation in a rotating direction ω, in order to transfer angularly the reading devices 12, placed thereon in such a way that each of them is transferred and positioned, for each complete rotation of the surface 13, subsequently in correspondence to the first section S1 and the second section S2.

The first conveying means T1 are aimed at transferring and introducing the supports 11, one after another, from the magazine 10 to a respective reading device 12, which has been placed in the meantime in a position corresponding to the first section S1, by the work surface 13 of the unit L.

The second conveying means T2 are aimed at transferring the supports 11, one after another and after the recognition of the data stored therein by a relative reading device 12, which has been placed in the meantime in a position corresponding to the second section S2, by the unit L, to the section 20 of the line A, to be associated to a relative document D fed by the line A to the section 20.

The reading devices 12 are of the type, which receives the supports to be recognized in its inside, after the supports have been introduced through a relative slot, keeps them inside for the time necessary to perform the relative recognition and reading of the data stored therein, and ejects them partially through the slot, after the above operations have been completed.

The coordination between the operation of the feeding line A, the driving of the work surface 13 into rotation and respectively the first conveying means T1 and the second conveying means T2, and contemporarily the performing of the reading and recognizing of the data stored in the supports 11 by the reading devices 12, is assured by the fact that the electronic processor 30 interacts with the control unit C by electromagnetic waves, in particular by radio-frequency waves.

The electronic processor 30 and the control unit C are programmed in such a way, that the work surface 13 is rotated in the rotating direction ω in accordance with the operation of the first conveying means T1 and the second conveying means T2, and with the operation of the feeding line A.

In particular, the electronic processor 30 and the control unit C are programmed to interact, so that the time necessary for transferring one support 11, by a work surface 13 and the second conveying means T2, from the first section S1 to the section 20 of the feeding line A, corresponds to the time necessary for moving a corresponding document D, to which the support 11 is to be associated, from a reference section 50 of the feeding line A, situated upstream of the section 20, the section 20.

More in detail, according to a preferred embodiment, the electronic processor 30 and the control unit C are programmed to interact, so that:
- the feeding line A is operated continuously with a proper and characteristic speed of the enveloper machines;
- the work surface 13 is operated, by the actuator means 40, to rotate in the rotating direction ω by successive basic rotation angles θ, in accordance and in step relation with the feeding of the feeding line A, and in accordance with the operation of the first conveying means T1 and the second conveying means T2, in order to assure that each passage of a document D in the section 20 of the line A matches with the transferring of a relative support 11 to the section 20, by the second conveying means T2, so that the support is joined to the document D.

For this purpose, as shown in FIG. 1:
- the reading devices 12 are situated on the work surface 13, angularly equidistant one from another by an elementary reference angle θ';
- the work surface 13 is rotated by the actuator means 40, by subsequent elementary angles θ;
- the first section S1 of the work unit L is adjacent to and situated after the second section S2, with respect to the rotating direction ω of the work surface 13, in particular they define an angle θ", whose width corresponds to the elementary reference angle θ', (that is the angular rotation performed by the work surface 13 to convey, in the rotating direction ω, a reading device 12 from the first section S1 to the second section S2, is equal to 360°-θ).

Consequently, joining the supports 11 to relevant documents D, which occurs in the section 20 during the feeding of the line A, is independent from the reading and recognition of the identifying data stored in the supports 11, performed by the reading devices 12 during the supports transferring, by the rotation of the work surface 13, between the first section S1 and the second section S2.

It is to be pointed out that the time necessary to convey a reading device 12 from the first section S1 (section, where the supports are introduced into relative reading devices) to the second section S2 (support ejection section), that is time necessary for the work surface 13 to perform a rotation of 360°- θ", is such as to allow the reading device 12 to perform the recognizing and reading of the data stored in the support introduced therein.

Preferably, this time is more than 2 seconds.

Other characteristic features of the apparatus 100 proposed by the present invention are described in the following.

Preferably, but not exclusively, the documents D, containing the personal pieces of information concerning respective recipients, are fed to the reference section 50 of the feeding line A in the same transferring order, in which the corresponding supports 11 are transferred from the magazine 10, by the first conveying means T1, to respective reading devices 12, which have been placed one after another at the first section S1 by the unit L.

Otherwise, the documents D can be fed to the reference section 50 without containing any information.

For this purpose, the apparatus 100 can have a printing unit (not shown, as of known type), situated right in the section 50 and subjected to the control unit C.

Due to the transferring of a support 11 to a reading device 12, situated in the first section S1, and in relation to the recognition of the data stored therein, identifying a given user, the printing unit can print the personal data concerning this user directly on the document D present in the section 50.

This is possible due to the coordination, in the above described way, between the control unit C and the electronic processor 30, with which the reading devices 12 are interfaced.

Advantageously, the apparatus 100 has means for reading bar codes (not shown, because likewise of known type), which are situated near the reference section 50, likewise subjected to the control unit C.

The bar code reading means read the bar codes, applied to the documents D, which identify corresponding recipients and which are present on the feeding line A and transiting through the section 50.

In this way, in relation to the information received from the electronic processor 30, the apparatus 100 can verify the actual correspondence between the bar code read on the document D, passing through the section 50, and the identifying data, recognized in the support 11, which has been in the meantime transferred and introduced into a relative reading device 12, placed in the first section S1 by the unit L; the compared data must correspond to the same user.

Figure 3:
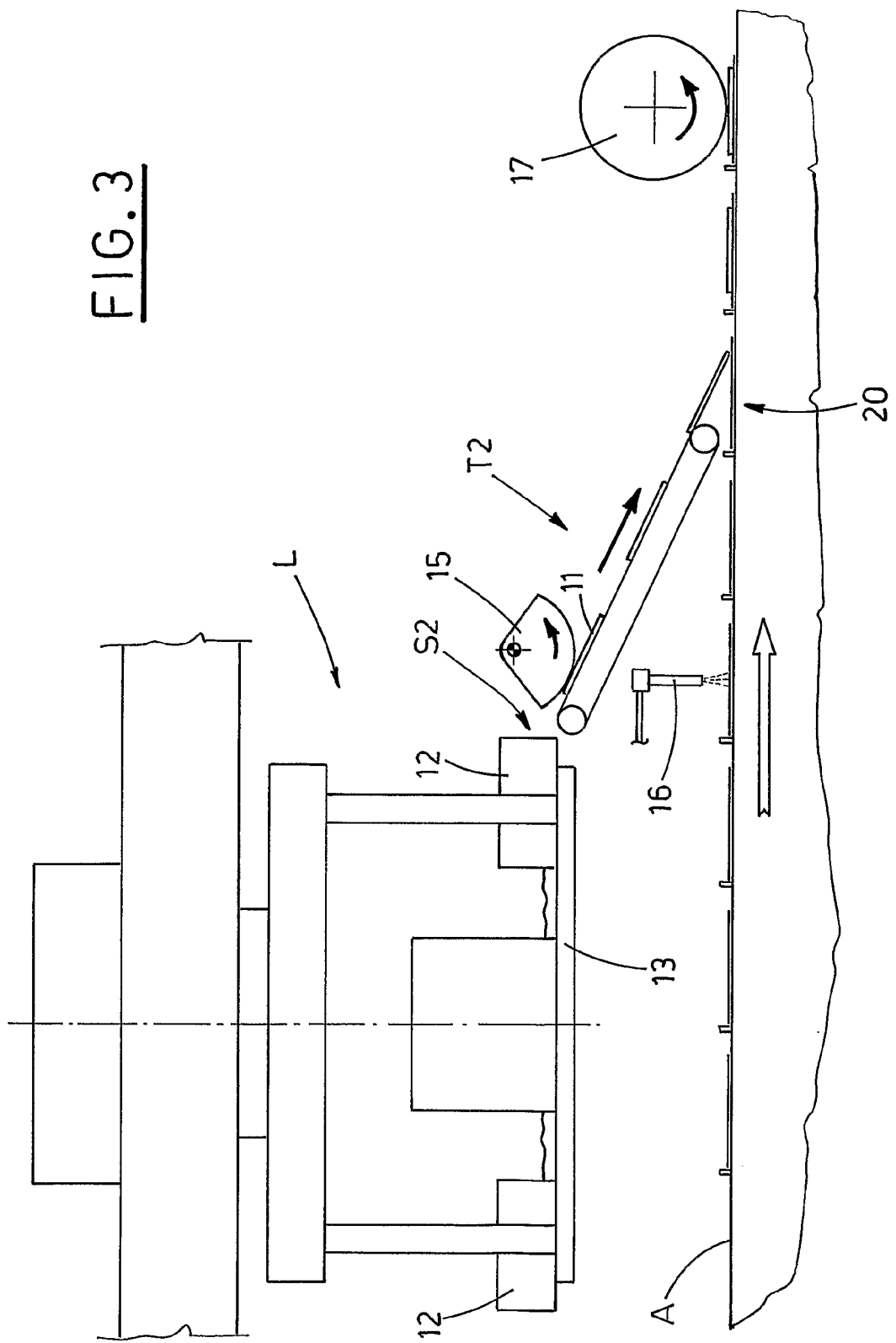
FIG. 3 is a section view taken along III-III of FIG. 1.

Further, as shown in detail in FIG. 3, the apparatus 100 includes withdrawing means 15, which are situated near the second section S2 and the initial portion of the second conveying means T2 and which are subjected to the control unit C.

The withdrawing means are operated by the control unit C, in accordance with the rotation of the work surface 13 and with the operation of the second conveying means T2 to remove completely the supports 11, which have been in the meantime partially removed by the relative reading device 12, placed meanwhile in a position corresponding to the second section S2, due to the rotation of the work surface 13.

The withdrawing means accompany the supports 11, resting on the second conveying means T2, assuring their correct placing thereon.

Gluing material applying means 16 are situated upstream of the section 20, where the supports 11 are associated to the relative documents D, and face the feeding line A to apply gluing material on a portion of the documents D, in correspondence to which the relative supports 11 will be joined.

Pressing means 17 are situated downstream of the section 20, likewise facing the feeding line A and pressing the supports 11, in order to assure their adherence to the relative documents D.

Moreover, the apparatus 100 is particularly functional, because it includes a support structure 19, which supports the work unit L and the relative work surface 13, suspended above the feeding line A: this allows not to intervene on the structure of the enveloper machine, to which the apparatus will be connected.

Further, another aspect to be pointed out is that also the electronic processor 30 for handling the reading devices 12 is situated on the work surface 13 and that it can interact with the control unit C by radio-frequency waves.

This allows a single cable to be used, coming from outside of the work surface 13, for feeding the electronic processor 30, which results in obvious simplification of the setting of electric cables, whose number is reduced.

It appears obvious from what has been previously described and explained in a detailed way, that the apparatus 100 wholly satisfies the prefixed object of recognizing the identifying data stored in relative supports, and of joining thereof to corresponding documents to be sent to respective recipients in such a way, as to assure the maintenance of a high processing rate of the relative envelopes machine, in particular within the range of 7000/8000 wrappings per hour.

Moreover, the apparatus 100 assures a secure association of the supports to the respective documents destined for the corresponding users.

It is also to be pointed out that the apparatus obtains the objects by an extremely functional and reliable technical solution, which does not require changes and substantial interventions on the structure of the enveloper machine, to which it will he associated.

It is understood that the proposed invention has been described, with reference to the enclosed figures, as a pure, not limiting example, and therefore, it is obvious that all the changes and variants suggested by the use can be applied thereto and remain within the protective scope defined by the following claims.

The invention claimed is:

1. An apparatus for recognizing user identifying data, stored in a support, and for joining the support to a corresponding document to be sent to the user, with said document being moved along a feeding line (A), which is controlled by a control unit (C), and which contains personal pieces of information to be sent to the user, characterized in that the apparatus includes:

at least one magazine (10) for storing a series of supports (11), with each of said supports (11) containing identifying data of a relevant user and being joined to a corresponding document of a plurality of documents (D);

a plurality of reading devices (12) for reading and recognizing the data stored in said supports (11);

a work unit (L), situated near said feeding line (A) and having a work surface (13), on which said reading devices (12) are placed, with said work unit (L) operating said work surface (13) into rotation in a rotating direction ($\omega$), to convey angularly the reading devices (12), so that each reading device is placed, for each complete rotation of said work surface (13), subsequently in positions corresponding to a first section (S1) and to a second section (S2) of said work unit (L);

first conveying means (T1), which are situated between said magazine (10) and said first section (S1) of the work unit (L), and which convey said supports (11), one after another, from the magazine (10) to a respective reading device (12) and which subsequently introduce said supports into said reading device (12), which reading device (12) has been concurrently placed by the work unit (L) in a position corresponding to the first section (S1), to recognize the data stored in the supports (11);

second conveying means (T2), which are situated between the second section (S2) of the work unit (L) and a third section (20) of said feeding line (A), and which convey said supports (11), one after another, from a relative reading device (12) to said third section (20), after the recognition of the data stored in the supports by the reading device (12), performed during the support passage, one after another, from the first section (S1) to the second section (S2), by the work unit (L), and as a consequence of the removal of the each support from the reading device (12), each said support (11) being joined to a corresponding document (D), fed by said feeding line (A) to the third section (20).

2. An apparatus, as claimed in claim 1, characterized in that said work unit (L) includes an electronic processor (30), situated on said work surface (13) and interfaced with each of the reading devices (12), and furthermore interacting with said control unit (C).

3. An apparatus, as claimed in claim 2, characterized in that said electronic processor (30) interacts with said control unit (C) by electromagnetic waves.

4. An apparatus, as claimed in claim 3, characterized in that said electronic processor (30) interacts with said control unit (C) by radio-frequency waves.

5. An apparatus, as claimed in claim 2, characterized in that said work unit (L) includes actuator means (40), controlled by said control unit (C), to rotate said work surface (13) in a rotating direction ($\omega$), in accordance with the operation of the first conveying means (T1) and the second conveying means (T2) and with operation, by the control unit (C), of said feeding line (A) for feeding documents (D), so that the time necessary for transferring a support (11), by the work surface (13) and the second conveying means (T2), corresponds to the time necessary for feeding of a corresponding document (D), to which said support (11) is to be joined, from a reference section (50) of said feeding line (A), situated upstream of said third section (20), to said third section (20).

6. An apparatus, as claimed in claim 5, characterized in that said reading devices (12) are situated on said work surface (13) in such a way that said work surface which has a slot for introduction-ejection of the supports (11) is turned near a circular peripheral edge of the work surface (13).

7. An apparatus, as claimed in claim 2, characterized in that the apparatus includes a single power cable, coming from outside of said work surface (13), and crossing the work surface for supplying power to said electronic processor (30).

8. An apparatus, as claimed in claim 1, characterized in that said reading devices (12) are situated on said work surface (13) such that said work surface, which has a slot for introduction-ejection of the supports (11), is turned near a circular peripheral edge of the work surface (13).

9. An apparatus, as claimed in claim 8, characterized in that said reading devices (12) are situated on said work surface (13), angularly equidistant by an elementary reference angle ($\theta'$).

10. An apparatus, as claimed in claim 9, characterized in that said work surface (13) is rotated by the actuator means (40) according to successive elementary reference angles ($\theta$), which have widths which correspond to said elementary reference angle ($\theta'$).

11. An apparatus, as claimed in claim 10, characterized in that said work unit (L) is adjacent and subsequent to said second section (S2), in the rotation direction ($\omega$) of said work surface (13).

12. An apparatus, as claimed in claim 11, characterized in that said second section (S2) and said first section (S1) define therebetween an angle ($\theta''$), having a width which corresponds to said elementary reference angle ($\theta'$).

13. An apparatus, as claimed in claim 12, characterized in that said feeding line (A) is operated continuously by the control unit (C) to transfer continuously the documents (D) from the reference section (50) to said third section (20), in that said work surface (13) is operated to rotate in said rotating direction ($\omega$) by the subsequent elementary reference angles ($\theta$), in accordance and in step relation with the continuous feeding of the feeding line (A), and in accordance with the operation of the first conveying means (T1) and the second conveying means (T2), so that each passage of a document (D) in the third section (20) of the feeding line (A) matches with transferring of a relative support (11) to the third section (20), by the second conveying means (T2), so as to join said relative support to the fed document (D).

14. An apparatus, as claimed in claim 9, characterized in that said feeding line (A) is operated continuously by the control unit (C) to transfer continuously the documents (D) from the reference section (50) to said third section (20), in that said work surface (13) is operated to rotate in said rotating direction ($\omega$) by the successive elementary reference angles ($\theta$), in accordance and in step relation with the continuous feeding of the feeding line (A), and in accordance with the operation of the first conveying means (T1) and the second conveying means (T2), so that each passage of a document (D) in the third section (20) of the feeding line (A) matches with transferring of a relative support (11) to the third section (20), by the second conveying means (T2), so as to join said relative support to the fed document (D).

15. An apparatus, as claimed in claim 14, characterized in that said documents (D), containing personal pieces of information and having bar codes, which identify respective users, are fed to the reference section (50) of the feeding line (A) in the same transferring order, in which corresponding supports (11) are transferred from the magazine (10), by said first conveying means (T1), to respective reading devices (12), which have been placed in succession in a position corresponding to the first section (S1) by the work unit (L), by means of the rotation ($\omega$) of the work surface (13).

16. An apparatus, as claimed in claim 15, characterized in that the apparatus includes bar code reading means, situated in said reference section (50) of the feeding line (A), to read a bar code present on each of the documents (D), when each of the documents transits in the reference section (50), with said reading means being interfaced with said control unit (C), so that the control unit (C) can, in relation to the information received from said electronic processor (30), verify a correspondence between the document (D), passing through the reference section (50), and the respective support (11), which has been concurrently transferred and introduced, by said first means (T1), into a relative reading device (12), situated in the first section (S1).

17. An apparatus, as claimed in claim 14, characterized in that the apparatus includes a printing unit, situated in said reference section (50) of the feeding line (A), and controlled by the control unit (C), and in that the personal pieces of information relative to respective users are printed on a relative document (D), fed to the reference section (50) as a consequence of the transferring of a corresponding support (11) by said first conveying means (T1) to a related reading device (12), which has been placed in the first section (S1) by the work unit (L), and of the subsequent recognition of the identifying data by the related reading device (12).

18. An apparatus, as claimed in claim 17, characterized in that the apparatus includes bar code reading means, situated in said reference section (50) of the feeding line (A), to read a bar code present on each of the documents (D), when each of the documents transits in the reference section (50), with said reading means being interfaced with said control unit (C), so that the control unit (C) can, in relation to the information received from said electronic processor (30), verify a correspondence between the document (D), passing through the reference section (50), and the respective support (11), which has been concurrently transferred and introduced, by said first conveying means (T1), into a relative reading device (12), situated in the first section (S1).

19. An apparatus, as claimed in claim 1, characterized in that the apparatus includes withdrawing means (15), which are situated near the second section (S2) and an initial portion of the second conveying means (T2) and which are controlled by the control unit (C), to be operated thereby, in accordance with the rotation of said work surface (13) and operation of the second conveying means (T2) to remove completely the supports (11), after the data stored therein has been recognized, said supports (11) being partially removed from the relative reading device (12) and placed in a position corresponding to the second section (S2), due to the rotation of the work surface (13); said withdrawing means (15) accompanying said supports (11), resting on the second conveying means (T2), assuring correct placement thereof.

20. An apparatus, as claimed in claim 1, characterized in that the apparatus includes glue material applying means (16), which are situated upstream of said third section (20) and which face the feeding line (A) for feeding documents (D), to apply glue material on a portion of each document (D) where a support (11) is to be joined.

21. An apparatus, as claimed in claim 20, characterized in that the apparatus includes pressing means (17), situated downstream of the third section (20), and facing the feeding line (A) to press each support (11), in order to assure adherence to each received document (D).

22. An apparatus, as claimed in claim 1, characterized in that the apparatus includes a support structure (19), which supports said work unit (L) and the relative work surface (13), suspended above said feeding line (A).

23. An apparatus, as claimed in claim 1, characterized in that the reading devices (12) receive thereinside the supports (11) to be recognized, after introduction of the supports through a relative slot, the reading devices holding the supports (11) thereinside while concurrently recognizing and reading data stored in the supports and, after having recognized and read the data, ejects partially the supports through said slot.

24. An apparatus, as claimed in claim 1, characterized in that the time necessary to transfer a reading device (12) from said first section (S1) to said second section (S2), by the work unit (L) by means of the rotation ($\omega$) of the relative work surface (13), is so long that said reading device (12) can perform the recognizing and reading of data stored in the support introduced therein.

25. An enveloper machine for enveloping a document, having personal information relative to a recipient, together with a relevant support storing the user's identifying data, including a feeding line (A) for feeding the documents and characterized in that the enveloper machine includes an apparatus as claimed in claim 1.

* * * * *